(No Model.)
W. D. HARPER.
TWO WHEELED VEHICLE.
No. 438,742. Patented Oct. 21, 1890.
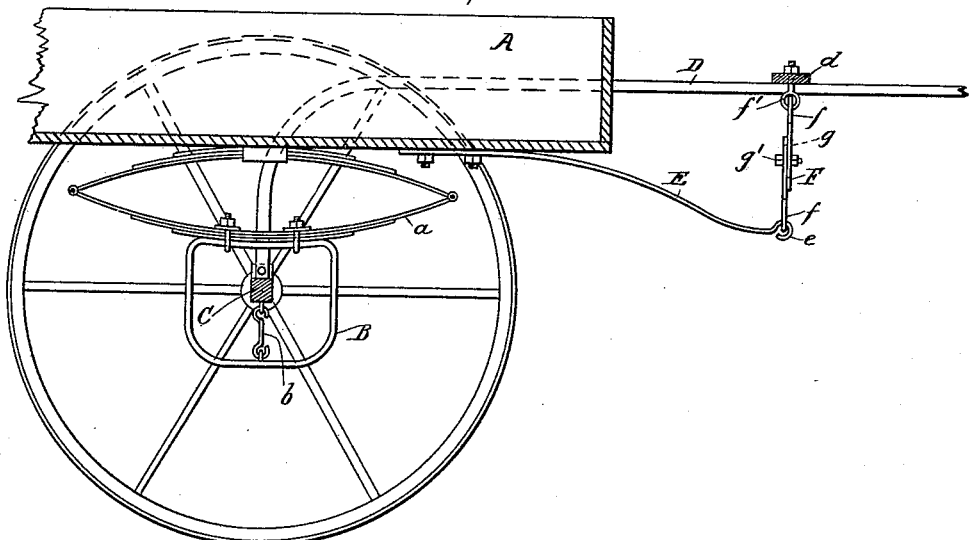
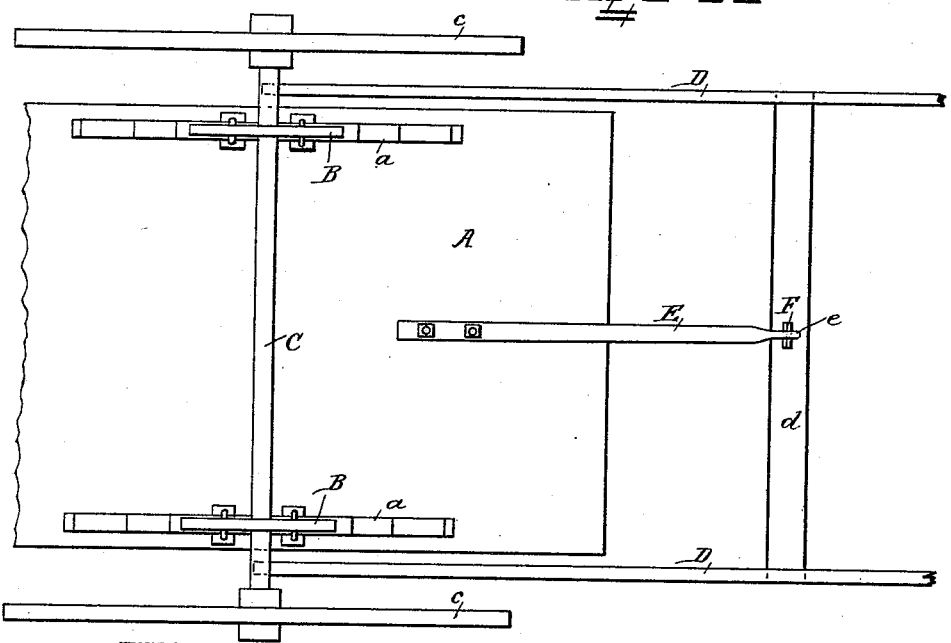
WITNESSES
Walter Allen
C. D. Davis
INVENTOR
Wm. D. Harper.
by Herbert W. T. Jenner.
Attorney
THE NORRIS PETERS CO., PHOTO-LITHO., WASHINGTON, D. C.

UNITED STATES PATENT OFFICE.

WILLIAM D. HARPER, OF QUANAH, TEXAS.

TWO-WHEELED VEHICLE.

SPECIFICATION forming part of Letters Patent No. 438,742, dated October 21, 1890.

Application filed April 26, 1890. Serial No. 349,601. (No model.)

*To all whom it may concern:*

Be it known that I, WILLIAM D. HARPER, a citizen of the United States, residing at Quanah, in the county of Hardeman and State of Texas, have invented certain new and useful Improvements in Vehicles; and I do hereby declare the following to be a full, clear, and exact description of the invention, such as will enable others skilled in the art to which it appertains, to make and use the same.

This invention relates to all kinds of vehicles; and it consists in the novel construction and combination of the parts hereinafter fully described and claimed.

In the drawings, Figure 1 is a longitudinal section through the front portion of a vehicle constructed according to this invention, and Fig. 2 is a plan view of the same from below.

A is the body of the vehicle, and $a$ are the side springs, which may be of any approved form, secured to the under side of the vehicle-body.

B are bow-shaped brackets secured to the under side of springs $a$.

C is the axle, and $c$ are the wheels upon the ends of the axle. The axle C passes through the brackets B, and $b$ are links pivoted to the under side of the axle and to the lower parts of brackets B, so that the body rests upon the springs and is suspended from the axle and free to vibrate in every direction.

D are the shafts attached to the axle, and $d$ is a cross-bar, which connects the two shafts together in front of the vehicle-body.

E is a spring secured at its rear end to the under side of the vehicle-body and provided with the eye $e$ at its front end, which projects in front of the body.

F is a link, provided with eyes $f$ at each end and pivotally connected to the said eye $e$ at its lower end and to the eyebolt $f'$ at its upper end. The eyebolt $f'$ is secured to the cross-bar $d$, and the spring E prevents the jolting motion of the animal from being communicated to the vehicle-body.

The link F is made in two parts, and in order that the length of the link may be adjusted, one or both of these parts are provided with slots $g$. A bolt $g'$ passes through the halves of the link and secures them together after the length of the link had been adjusted.

What I claim is—

The combination, with the vehicle-body, the side springs secured thereto, and the bow-shaped brackets secured to said springs, of the axle and the shafts secured to the axle, the links pivoted to the axle and to said brackets and suspending the vehicle-body from the axle, the spring having its rear end secured to the vehicle-body and provided with an eye at its front end, the cross-bar connecting the shafts, an eyebolt depending from the said cross-bar, and the adjustable link adapted to be lengthened or shortened to regulate the position of the shafts with respect to the front end of the vehicle-body and pivoted at its opposite ends to the said eyebolt and to the eye at the end of the said spring, substantially as and for the purpose set forth.

In testimony whereof I affix my signature in presence of two witnesses.

WILLIAM D. HARPER.

Witnesses:
B. P. EUBANK,
W. E. JOHNSON.